US008881976B1

(12) United States Patent
Williams

(10) Patent No.: US 8,881,976 B1
(45) Date of Patent: Nov. 11, 2014

(54) METHOD FOR OBTAINING A BALANCE AND WITHDRAWING FUNDS FROM A PREPAID ACCESS DEVICE BY LAW ENFORCEMENT

(71) Applicant: Thomas J Williams, Fort Worth, TX (US)

(72) Inventor: Thomas J Williams, Fort Worth, TX (US)

( * ) Notice: Subject to any disclaimer, the term of this patent is extended or adjusted under 35 U.S.C. 154(b) by 104 days.

(21) Appl. No.: 13/757,730

(22) Filed: Feb. 1, 2013

Related U.S. Application Data

(63) Continuation-in-part of application No. 61/598,259, filed on Feb. 13, 2012.

(51) Int. Cl.
*G06Q 40/00* (2012.01)
*G06Q 40/02* (2012.01)

(52) U.S. Cl.
CPC .................................... *G06Q 40/02* (2013.01)
USPC ......................................... 235/379; 235/380

(58) Field of Classification Search
USPC ...................... 235/379, 380, 382; 705/35, 44
See application file for complete search history.

(56) References Cited

U.S. PATENT DOCUMENTS 8,762,266 B2 * 6/2014 Moran et al. .................... 705/39
2004/0257231 A1 * 12/2004 Grunes et al. ............. 340/572.1
2006/0271457 A1 * 11/2006 Romain et al. ................. 705/35

* cited by examiner

*Primary Examiner* — Ahshik Kim
(74) *Attorney, Agent, or Firm* — Mark W Handley

(57) ABSTRACT

A method is disclosed for use by law enforcement for obtaining a balance and seizing funds from prepaid access devices using existing clearing and settlement networks for open loop branded bank cards and closed loop private label cards. A payment terminal has a scanner for reading indicia from the prepaid access devices. A merchant identity is used for cloaking the identity of law enforcement. A balance inquiry instruction is forwarded to an issuing processor, which polls an issuing financial institution for the balance of the funds available in an associated account. An encumbering instruction is then forwarded to the issuing processor and the issuing financial institution, which includes at least one of a seize instruction and a freeze instruction. A claiming instruction is then forwarded to the issuing financial institution to forward the balance of the funds from the associated account to a law enforcement account.

18 Claims, 5 Drawing Sheets

METHOD FOR OBTAINING A BALANCE AND WITHDRAWING FUNDS FROM A PREPAID ACCESS DEVICE BY LAW ENFORCEMENT

TECHNICAL FIELD OF THE INVENTION

The present invention relates in general to prepaid access device transactions, and in particular to securing funds stored in prepaid access device accounts.

CROSS-REFERENCE TO RELATED APPLICATION

The present application is related to U.S. Provisional Application Ser. No. 61/598,259, filed Feb. 13, 2012, invented by Thomas J. Williams, and entitled "Obtaining A Balance And Withdrawing Funds From A Prepaid Access Device By Law Enforcement."

BACKGROUND OF THE INVENTION

Criminal organization and drug traffickers are increasingly using prepaid cards, or prepaid access devices, rather than cash for illegal transactions in attempts to reduce the risk of loss from theft and law enforcement intervention. Laws currently require that travelers entering and leaving the United States declare when the aggregated value of cash and other monetary instruments exceed a value of ten thousand dollars. Proposed legislation would also require that prepaid cards and other prepaid access devices be included in such declarations. Law enforcement frequently seizes cash and prepaid access devices when discovered as undeclared and being brought into and taken out of the country, as well as during arrests and drug seizures. However, law enforcement does not currently have the equipment nor the methodology to determine the values of balances for the seized prepaid access devices, nor to freeze and subsequently seize the funds held in accounts associated with the prepaid access devices.

The balances on associated account for seized prepaid access devices may quickly be drawn down by criminals prior to law enforcement seizure if funds in the associated accounts are not quickly seized, or quickly frozen for later claiming. Technology advances can allow the value balances from prepaid access devices to be moved in seconds from one to another, anywhere in the world with use of mobile devices, creating exigent circumstances which require prompt action. Law enforcement may also have difficulty in identifying prepaid access devices, such as which may occur when the information contained on a magnetic strip of a branded prepaid access device may be stripped off of open loop branded cards or closed loop cards and moved onto nondescript cards, such as a non-embossed card of paper or plastic having a magnetic stripe which are often used for hotel room keys. Equipment and a methodology are required for law enforcement officers to quickly determine whether machine readable devices are encoded with prepaid access data, and if so, to quickly determine the value of the balance associated with the prepaid access devices and to quickly freeze or seize the associated balance.

The Financial Crimes Enforcement Network ("FinCEN"), a bureau of the U.S. Department of Treasury, is tasked under the Bank Secrecy Act with monitoring monetary transfers of large sums of money. FinCEN is currently proposing amendments to the Bank Secrecy Act which would require that prepaid access devices be included in declarations required when aggregate values of cash and monetary instruments exceed a prescribed amount, currently ten thousand dollars.

The legislation proposed by FinCEN defines prepaid access devices as any open or closed loop prepaid access account and or device, regardless of technology, including, but not limited to, plastic cards with magnetic stripes, plastic cards with chip-n-pin or near field communications devices embedded into a form factor to facilitate use of the prepaid access account. As used herein, prepaid access devices shall include the definition set forth above by FinCEN, and further include machine readable devices on which prepaid account data may be imprinted, embossed or encoded, including devices with readable magnetic strips, and other encoded electronics, such as those read by direct electrical contact connections, optical imaging, and near field communications ("NFC") devices, such as RFID chips.

SUMMARY OF THE INVENTION

A novel method is disclosed for use by law enforcement to obtain account balances and then to promptly either seize or freeze funds for later seizure in accounts associated with prepaid access devices. A payment terminal is provided to law enforcement, which may be a wireless terminal, a wired terminal, a personal computer, a mobile phone, tablet or other electronic device accessing a web portal or using a software application. The payment terminal may also be either a handheld or large form factor. A law enforcement officer using a payment terminal can swipe a card, or read another type prepaid access device, and a balance inquiry transaction will be sent to the open loop network settlement and clearing processor or closed loop network system for the associated prepaid access devices. Using the existing branded networks infrastructure such as MasterCard or Visa, or existing closed loop network system such as Blackhawk, law enforcement would be able to obtain the value of a prepaid access device in real time at point of arrest. The requests will preferably be cloaked to appear as a typical merchant to prevent alerting account holders that law enforcement is seeking account balances for initiating seizures or freezing funds in the associated accounts. Once values for various account balances are obtained, law enforcement then issue a transaction which includes either a seizure or freeze instruction forwarded to the issuing processor and the issuing institution requiring holding of the funds in the associated account. When initial freeze instructions are required by the laws of local jurisdictions, the transaction is forwarded containing the freeze instructions to require the issuing institution to hold the funds for a period of time to allow for law enforcement to obtain any legal empowerment required by law to seize the values of the balances tied to the prepaid access devices. Law enforcement can enter transactions individually, or in bulk, to obtain the values for balances of prepaid access devices and receive funds into accounts set up by law enforcement using existing open loop branded bank card or closed loop private label clearing and settlement networks.

As a result of these transactions, data elements will be captured to support further investigations and to analyze trends being utilized for financing illicit activities. There is significant intelligence embedded in the account numbers of a prepaid access device. Of interest is the Bank Identification Number (BIN) that allows for law enforcement officers to determine the name and contact information of the card issuer and provide the legal authority as required by law to seize the funds. The information provided by the bank will provide the ability to identify the issuing processor of the cards and with proper legal authority access to transactional records tied to prepaid access card accounts and other affiliated accounts.

DESCRIPTION OF THE DRAWINGS

For a more complete understanding of the present invention and the advantages thereof, reference is now made to the following description taken in conjunction with the accompanying Drawings in which

FIG. 1 is a block diagram illustrating law enforcement payment terminals being used with open loop conventional bank card or closed loop private label card clearing and settlement network infrastructures for seizure of funds in accounts associated with prepaid access devices;

FIG. 2 is a flow chart illustrating a process for obtaining a balance of an account associated with a prepaid access device;

FIG. 3 is a flow chart illustrating a process for seizing a fund balance of an account associated with a prepaid access device;

FIG. 4 is a flow chart illustrating a process for freezing a fund balance of an account associated with a prepaid access device; and FIG. 5 is a flow chart illustrating a process for claiming a fund balance of an account associated with a prepaid access device which has been frozen.

DETAILED DESCRIPTION OF THE INVENTION

Figure 1:
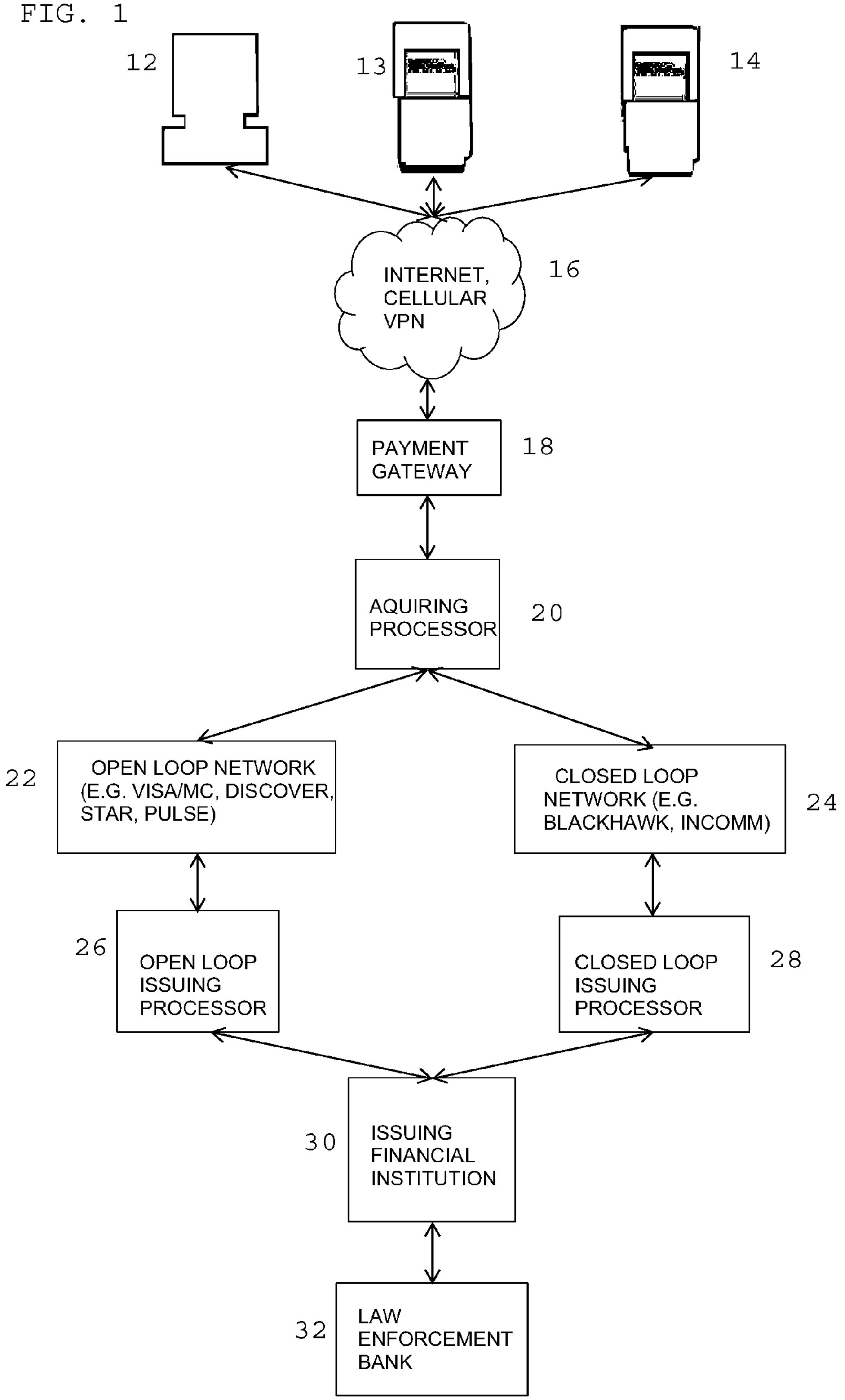
FIGS. 1 through 5 show various aspects for method and apparatus for obtaining balances and withdrawing funds from accounts associated with prepaid access devices by law enforcement according to the present invention, as set forth below.

FIG. 1 is a block diagram illustrating law enforcement payment terminals 12, 13 and 14 provide for use with conventional bank card open loop or closed loop private label card clearing and settlement network infrastructure for seizure of funds in accounts associated with prepaid access devices. The payment terminals 12, 13 and 14 provided to law enforcement implemented as devices having either a hand-held or large form factor, including a wireless terminal, a wired terminal, a personal computer, a mobile phone, a tablet or other electronic device accessing a web portal or using a software application. For example, the wireless terminal 12, the wired terminal 13 or a personal computer with the virtual terminal 14 may be used for collecting information for accounts associated with prepaid access devices, either by reading encoded data or keyed entry by an officer using one of the terminals 12, 13 and 14. Each of the payment terminals 12, 13 and 14 will preferably independently interface through a communication network 16 to conventional open loop bank card or closed loop private label card clearing and settlement networks, such as those branded by MasterCard and Visa, or closed loop networks such as American Express and Blackhawk. Preferably, balance inquiries are cloaked to not disclose the identity of law enforcement to the clearing and settlement networks, including the issuing institution, but rather to appear as a traditional merchant so that the funds will not be withdrawn prior to freeze or seizure. Freezing or seizure of funds by law enforcement encumbers the funds so that they cannot be removed from associated accounts by criminal organizations, but instead may be possessed by law enforcement. The clearing and settlement networks typically include a payment gateway 18, an acquiring processor 20, an open loop network 22 or closed loop network 24, an open loop issuing processor 26 or closed loop issuing processor 28, and the issuing financial institution 30. After prepaid access device funds are claimed and seized by law enforcement agencies, they are then transferred from the prepaid access device issuing financial institution 30 directly to an account in a law enforcement bank 32.

Figure 2:
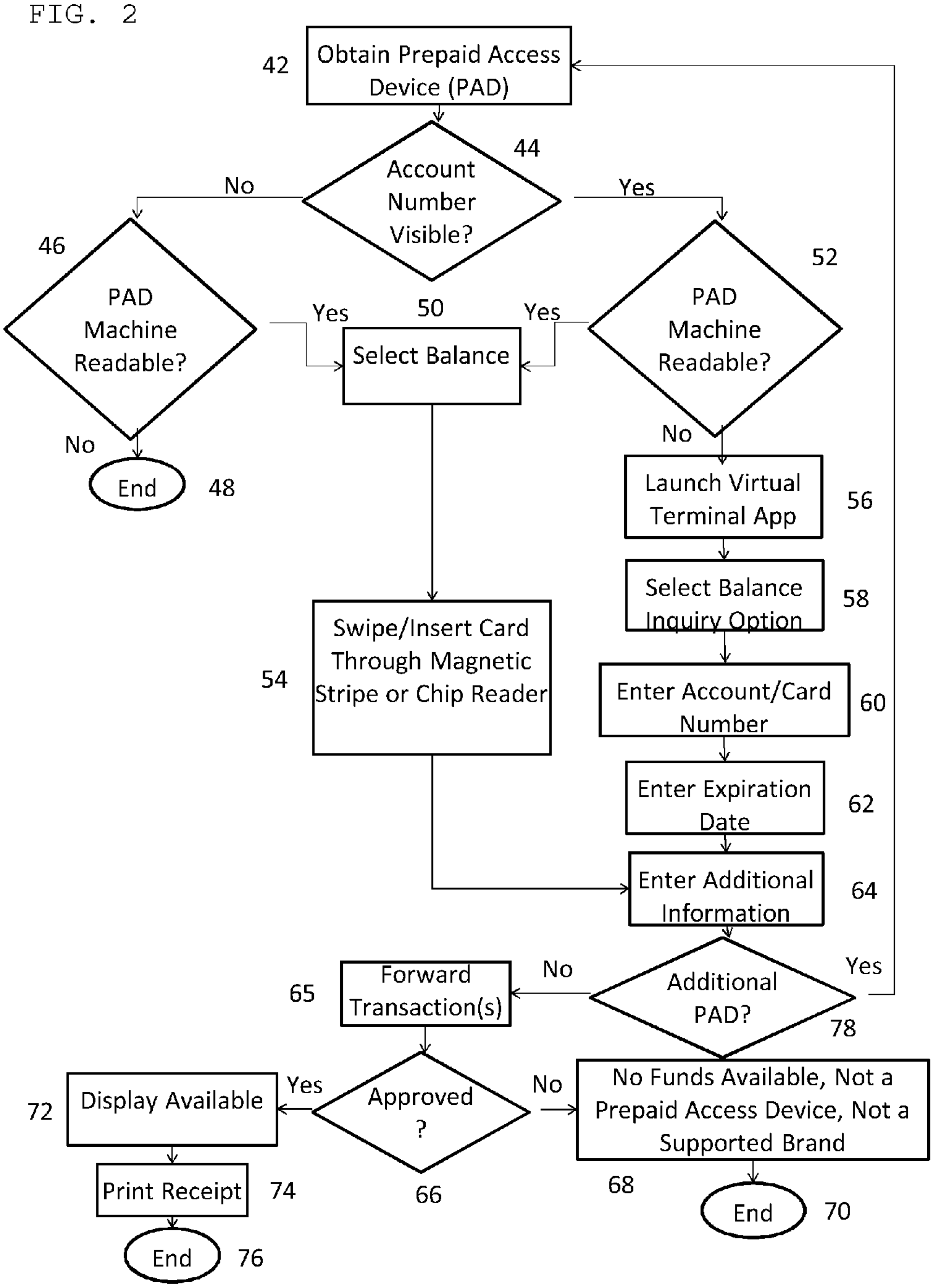

FIG. 2 is a flow chart illustrating a process for obtaining a balance of an account associated with a prepaid access device. In step 42 the prepaid access device is first obtained by law enforcement. Then, in step 44 a determination is made as to whether the prepaid access device has a visible account number by reviewing embossed or printed indicia placed directly on a prepaid access device. If the prepaid access device does not have a visible account number, the process proceeds to step 46, and a determination is made as to whether the prepaid access device is machine readable, preferably by determining whether the device has access to a magnetic stripe, electric contacts or a Near Field Circuit ("NFC") readable circuit embedded in or mounted to the prepaid access device. As used herein, the term "machine readable" and "machine read" refers to encoded data or devices on which data is encoded, including, but not limited to data magnetically encoded on magnetic stripes; data electrically or magnetically encoded in electronic circuits which may be embedded in or mounted to devices, such devices including prepaid cards and electronic chips, and including electronic circuits which transmit optical data signals; and data optically encoded by imprinting, embossing or storing by other means which may be optically read. If the prepaid access device is not machine readable, the process proceeds to step 48 and ends, since without the card having visual indicia, information cannot be manually input by an officer for identifying a card account and the card network or closed loop system to which the non-branded card corresponds. If law enforcement determines it has a machine readable device, the process proceeds to step 50, a balance inquiry option is selected, and the process proceeds to step 54.

If in step 44 a determination is made that the prepaid access device has a visible account number, the process proceeds to step 52 and a determination is made as to whether the prepaid access device is machine readable. If a determination is made in step 52 that the prepaid access device contains machine readable indicia, the process proceeds to the step 50, then the balance inquiry option is selected and the process proceeds to step 54. In step 54 the encoded prepaid access device indicia is machine read by a device reader incorporated into one of the payment terminals 12, 13 and 14, and then the process proceeds to step 64 in which additional information is entered. If in step 52 it is determined that the prepaid access device does not have machine readable data but has visually imprinted account indicia, the process proceeds from step 52 to step 56. In step 56 a virtual terminal application is launched on one of the payment terminals 12, 13 and 14, and a balance inquiry option is selected in step 58. The imprinted prepaid access device indicia account number is entered in step 60. Typically an authentication code will be entered in step 62. The authentication code entered in step 62 is preferably an expiration date for the prepaid access device, but in other embodiments may be a personal identification number ("PIN"), which may be randomly selected and assigned by the issuer or selected by the holder, or number printed on the card, such as a credit card validation number ("CVV code"). Other indicia may be entered in the additional information entry step 64, including an identification code for the law enforcement officer entering the prepaid access device information. In step 78 a decision is made as to whether an additional prepaid access device is being processed for forwarding transactions in bulk. If another prepaid access device is to be entered, the process returns to step 42 and repeats entry or capture of account information and authentication. Transactions for a plurality of prepaid access devices may be forwarded at one time, in bulk, to prevent alerting owners of associated accounts that funds are being frozen or seized prior to law enforcement gaining control of the funds in the associated accounts. If instead there are no additional prepaid access devices for processing, the process proceeds to step 65. In step 65 the card indicia and a transaction containing instructions are then transferred individually or in bulk for more than one prepaid access device as shown in FIG. 1, through the communication network 16 to the payment gateway 18, and processed in conventional fashion through the acquiring processor 20, the open loop network 22 or closed loop network 24, the open loop issuing processor 26 or closed loop issuing processor 28, and the prepaid access device issuing financial institution 30. In step 65, the transaction(s) are preferably forwarded with the identity of law enforcement cloaked to appear as a traditional merchant so that the funds will not be withdrawn prior to capture by law enforcement. If approval is received in step 66, the available funds are displayed in step 72 and a receipt may be printed in step 74. The process then proceeds to the end step 76. If in step 66 the balance inquiry is not approved, the process proceeds to step 68 and the reason for non-approval may be displayed. The process then proceeds from the step 68 to the end step 70 and another prepaid access device may be processed.

Figure 3:
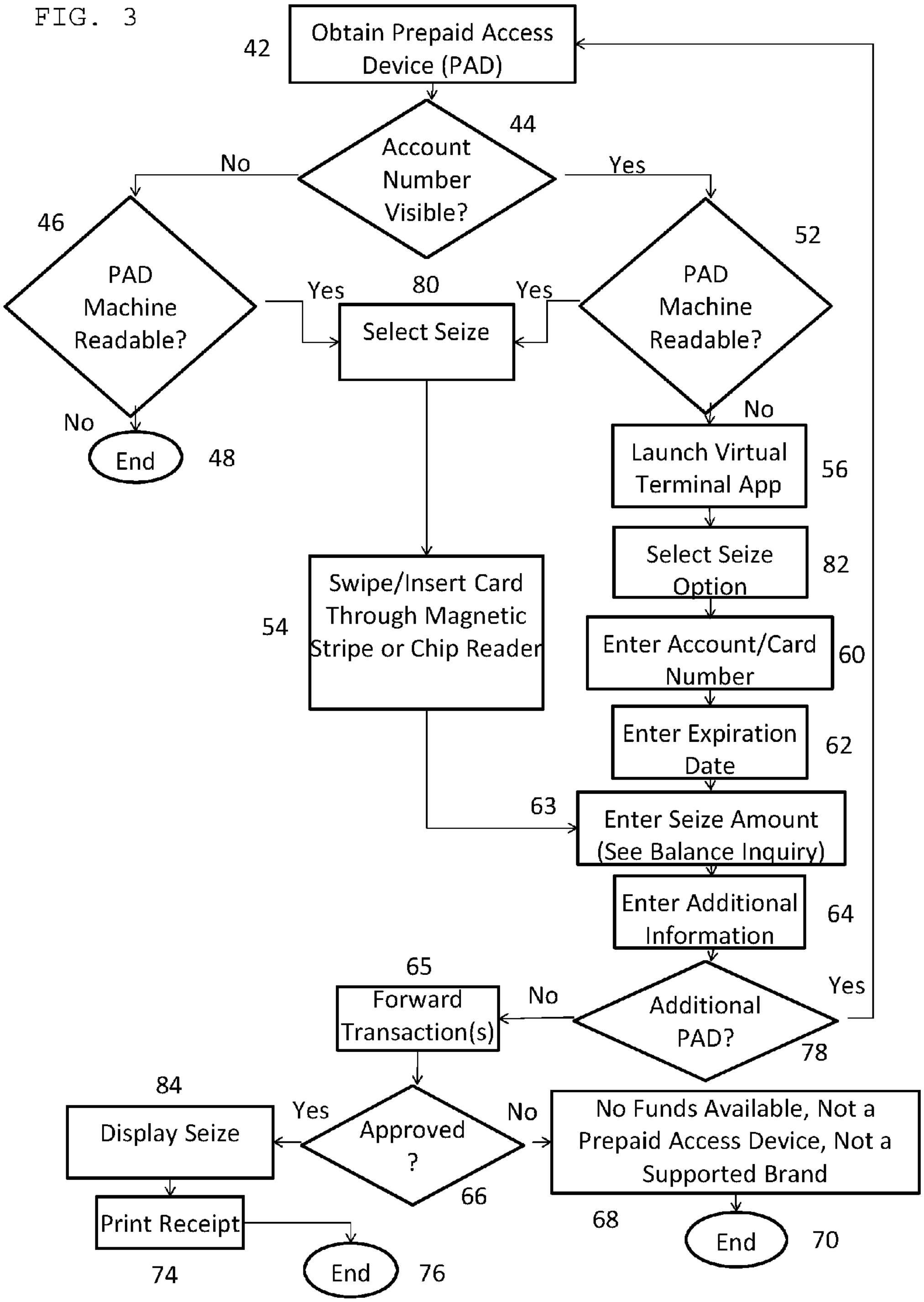

FIG. 3 is a flow chart illustrating a process for seizing a fund balance of an account associated with a prepaid access device. Seizing the funds will encumber the funds so that they cannot be recovered without action by law enforcement. In step 42 the prepaid access device is first obtained by law enforcement. Then, in step 44 a determination is made as to whether the prepaid access device has a visible account number by reviewing embossed or printed indicia placed directly on a prepaid access device. If the prepaid access device does not have a visible account number, the process proceeds to step 46 and a determination is made as to whether the prepaid access device is machine readable. If the prepaid access device is not machine readable, the process proceeds to step 48 and ends since without the card having visual indicia or being machine readable, information cannot be input by an officer for identifying a card account and card network or closed loop system to which the non-branded card corresponds. If the prepaid access device is machine readable, the process proceeds to step 80, a seize option is selected, and the process proceeds to step 54.

If in step 44 a determination is made that the prepaid access device has a visible account number, the process proceeds to step 52 and a determination is made as to whether the prepaid access device is machine readable. If the prepaid access device is machine readable, the process proceeds to step 80 and the seize option is selected and the process proceeds to step 54. In step 54 the encoded prepaid access device indicia is machine read by one of the payment terminals 12, 13 and 14, and then proceeds to step 63 where a seize amount is entered for the balance determined to be in the account in step 72 of FIG. 2. The process then continues to step 64 in which additional information is entered, such as an authentication code and an officer identification number. If in step 52 it is determined that the prepaid access device does not have machine readable data but has visually imprinted indicia, the process proceeds from step 52 to step 56 and a virtual terminal application is launched on one of the payment terminals 12, 13 and 14. Then a seize option is selected in step 82 and the imprinted prepaid access device indicia account number is entered in step 60. An authentication code is entered in step 62, which is typically an expiration date but other types of codes may be used. In step 63 a seize amount is entered for the balance determined to be in the account in step 72 of FIG. 2. Other indicia may be entered in the additional information entry step 64, such as an identification code for the officer entering the prepayment device data into the system.

In step 78 a decision is made as to whether an additional prepaid access device is being processed for forwarding transactions in bulk. If another prepaid access device is to be entered, the process returns to step 42 and repeats entry or capture of account information and authentication. Transactions for a plurality of prepaid access devices may be forwarded at one time, in bulk, to prevent alerting owners of associated accounts that funds are being frozen or seized prior to law enforcement gaining control of the funds in the associated accounts. If instead there are no additional prepaid access devices for processing, the process proceeds to step 65. In step 65, the card indicia and a transaction for one or more cards are then forwarded with the transaction(s) containing encumbering instructions directing the issuing institution to seize funds and transfer the seized funds to a law enforcement account in a selected bank, as shown in FIG. 1, through the communication network 16 to the prepaid access device gateway 18, and processed in conventional fashion through the acquiring processor 20, the open loop network 22 or closed loop network 24, the open loop issuing processor 26 or closed loop issuing processor 28 and the issuing financial institution 30. In step 65, the transaction(s) are preferably forwarded with the identity of law enforcement cloaked to appear as a traditional merchant so that the funds will not be withdrawn prior to capture by law enforcement. If approval is received in step 66, the amount of the funds seized is displayed in step 84 and a receipt may be printed in step 74. The process then proceeds to the end step 76. If in step 66 the seize transaction is not approved, the process proceeds to the step 68 and the reason for non-approval may be displayed. The process then proceeds from step 68 to the end step 70 and another prepaid access device may be processed.

Figure 4:
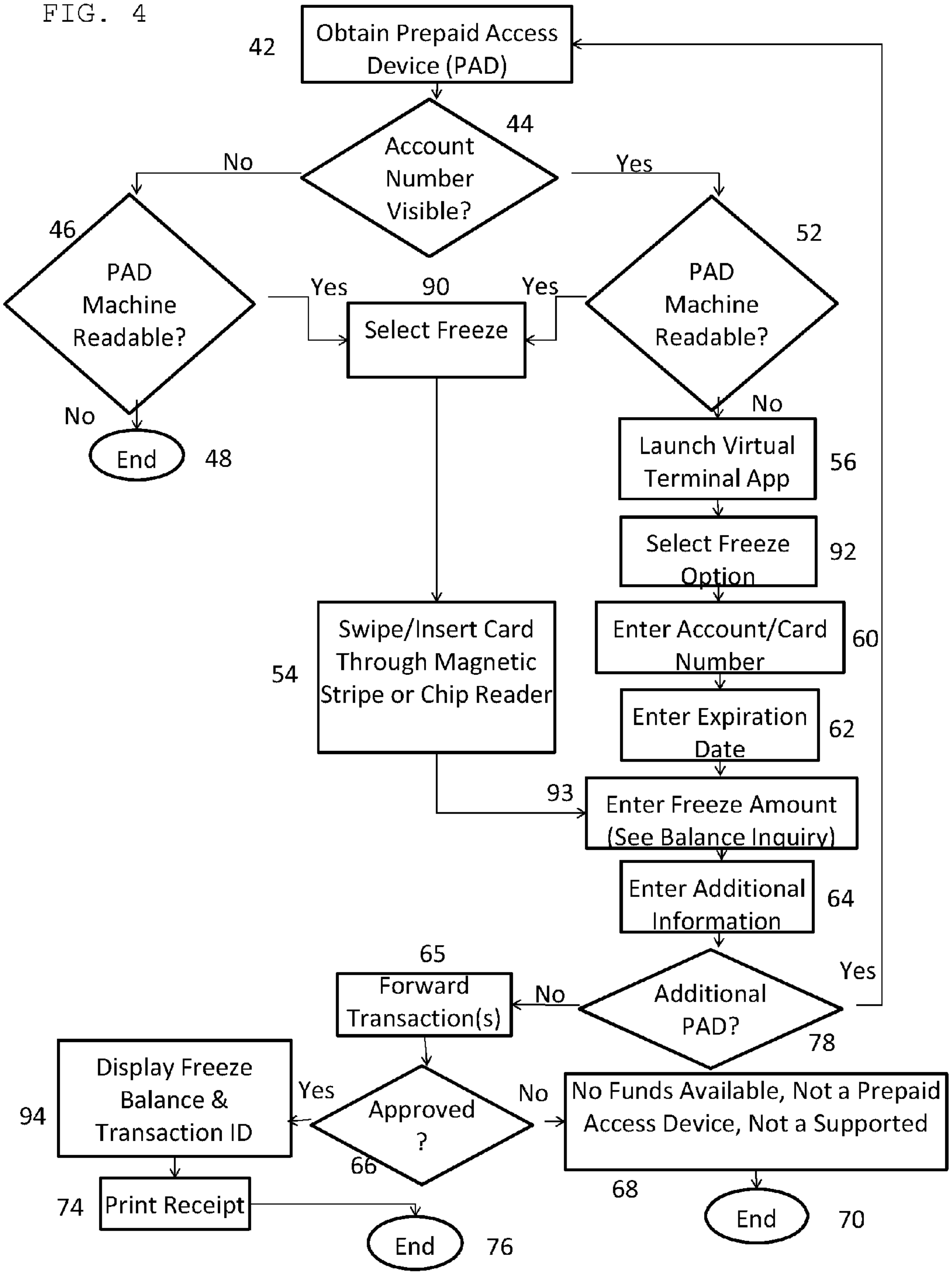

FIG. 4 is a flow chart illustrating a process for freezing a fund balance of an account associated with a prepaid access device. Freezing a fund balance encumbers the funds so that they cannot be removed prior to seizure by law enforcement. In step 42 the prepaid access device is first obtained by law enforcement. Then, in step 44 a determination is made as to whether the prepaid access device has a visible account number by reviewing embossed or printed indicia placed directly on a prepaid access device. If the prepaid access device does not have a visible account number, the process proceeds to step 46 and a determination is made as to whether the prepaid access device is machine readable. If the prepaid access device is not machine readable, the process proceeds to step 48 and ends since without the card having visual indicia, information cannot be input by an officer for identifying a card account and card network or closed loop system to which the non-branded card corresponds. If in step 46 a determination is made that the prepaid access device contains encoded device indicia which may be machine read, the process proceeds to step 90 and a freeze option is selected. Then the process proceeds to step 54. If in step 44 a determination is made that the prepaid access device has a visible account number, the process proceeds to step 52 and a determination is made as to the prepaid access device contains encoded device indicia which may be machine read. If the prepaid access device may be machine read the process proceeds to the step 90, then the freeze option is selected. The process then proceeds to the step 54 and the encoded prepaid access device indicia is machine read by a device reader incorporated into one of the payment terminals 12, 13 and 14. The process then proceeds to step 93 where a freeze amount is entered for the balance determined to be in the account in step 72 of FIG. 2. The process then continues to step 64 in which additional information is entered, such as a card identification code and a law enforcement officer identification number.

If in step 52 a determination is made that the prepaid access device does not have machine readable data but has visually imprinted device indicia, the process proceeds from step 52 to step 56 and a virtual terminal application is launched on one of the payment terminals 12, 13 and 14. Then, a freeze option is selected in step 92 and the imprinted prepaid access device indicia account number is entered in step 60. An authentication code is entered in step 62, such as an expiration date for the prepaid access device, or a code imprinted on the card. In step 93 a freeze amount is entered from the balance determined to be in the account in step 72 of FIG. 2. Other indicia may be entered in the additional information entry step 64, such as an identification code for the officer entering the prepayment device data into the system. In step 78 a decision is made as to whether an additional prepaid access device is being processed for forwarding transactions in bulk. If another prepaid access device is to be entered, the process returns to step 42 and repeats entry or capture of account information and authentication. Transactions for a plurality of prepaid access devices may be forwarded at one time, in bulk, to prevent alerting owners of associated accounts that funds are being frozen or seized prior to law enforcement gaining control of the funds in the associated accounts. If instead there are no additional prepaid access devices for processing, the process proceeds to step 65. In step 65 the card indicia and the transaction for one or more prepaid access devices are then forwarded with the transaction(s) containing an encumbering instruction directing the issuing institution to freeze the funds in the associated account(s). In step 65, the transaction(s) are preferably forwarded with the identity of law enforcement cloaked to appear as a traditional merchant so that the funds will not be withdrawn prior to capture by law enforcement. The card indicia and the transaction are forwarded as shown in FIG. 1, through the communication network 16 to the prepaid access device gateway 18, and processed in conventional fashion through the acquiring processor 20, the open loop network 22 or closed loop network 24, the open loop issuing processor 26 or the closed loop issuing processor 28 and the issuing financial institution 30. If approval is received in step 66, the funds subject to freeze are displayed in step 94 and a receipt may be printed in step 74 which lists a transaction identification number. The process then proceeds to the end step 76. If in step 66 the freeze transaction is not approved, the process proceeds to the step 68 and the reason for non-approval may be displayed. The process then proceeds from step 68 to the end step 70 and another prepaid access device may be processed.

Figure 5:
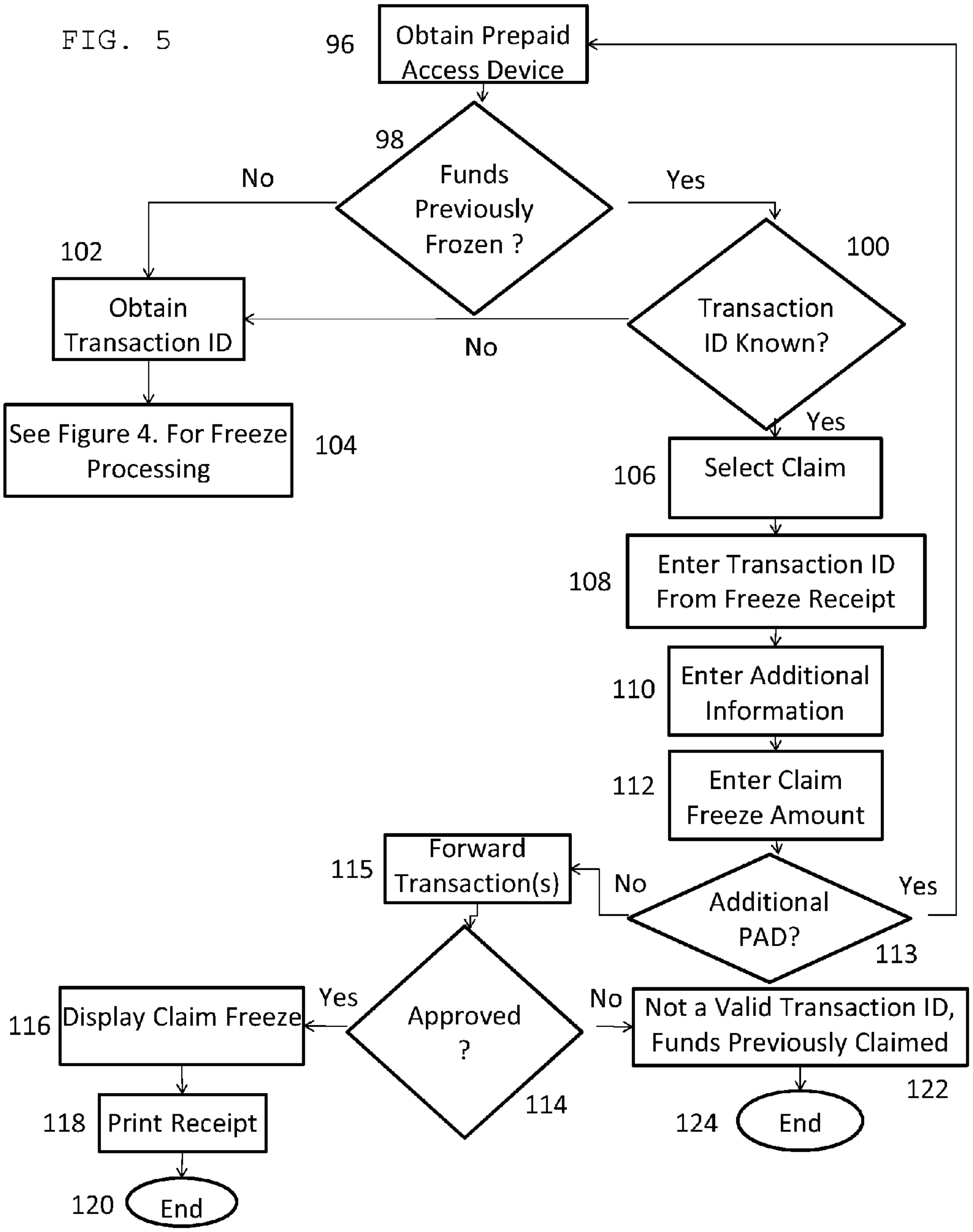

FIG. 5 is a flow chart illustrating a process for claiming a fund balance of an account associated with a prepaid access device which has been frozen. A law enforcement official claiming previously frozen funds will first obtain the prepaid access device in step 96. Then a determination is made in step 98 as to whether the funds associated with the prepaid access device have previously been frozen. If so, the process proceeds from step 98 to step 100 and a determination is made as to whether a transaction identification code is known to the user. If the transaction ID code is known the process proceeds to step 106, and if not the process proceeds to step 102 to obtain the transaction ID code, and then to step 104 and to the process set forth in FIG. 4 for freezing the funds in the account associated with the prepaid access device. If in step 98 a determination is made that the funds associated with prepaid access device were not previously frozen, the process will proceed from step 98 to step 102 to obtain the transaction ID, and then to step 104 and to the process set forth in FIG. 4 for freezing the funds in the account associated with the prepaid access device. If a determination is made in step 100 that the transaction identification code is known, then the process proceeds to the step 106 and the claim freeze option is selected. Then, in step 108 the transaction identification code is entered. Additional information may then be entered in step 110, and the claim amount is entered in step 112. In step 113 a decision is made as to whether an additional prepaid access device is being processed for forwarding transactions in bulk. If another prepaid access device is to be entered, the process returns to step 96 and repeats entry or capture of account information and authentication. Transactions for a plurality of prepaid access devices may be forwarded at one time, in bulk, to prevent alerting owners of associated accounts that funds are being frozen or seized prior to law enforcement gaining control of the funds in the associated accounts. If instead there are no additional prepaid access devices for processing, the process proceeds to step 115. In step 115 the entered information is forwarded as one or more transactions to the issuing institution to claim the frozen funds and transfer the funds to a law enforcement account in a selected bank. In step 115, the transaction(s) are preferably forwarded with the identity of law enforcement cloaked to appear as a traditional merchant so that the funds will not be withdrawn prior to capture by law enforcement. Then in step 114 a determination is made as to whether the transaction to claim the seized funds is approved. If the claim is approved in step 114, the process proceeds to step 116 and the claimed amount is displayed. In step 118 a receipt is printed for the amount of seized funds which are claimed, and then the process proceeds to the end step 120. If the claim is not approved in step 114, a message is displayed that either the transaction identification code is incorrect or the frozen funds were previously claimed, and then the process proceeds to the end step 124.

It should be noted that prepaid access devices may be processed individually, or in bulk. With bulk processing, encoded data and authentication codes may be collected and entered for a plurality of prepaid access devices for processing together at one time, in a single forward of transactions for each prepaid access device. Bulk processing may also be accomplished in sequence by rapid sequential transmission of plurality of transactions corresponding to each of a plurality of prepaid access devices. Bulk transactions may be preferable to individual transactions to prevent account holders from being alerted that funds are being withdrawn from accounts associated with the prepaid access devices.

The present invention provides advantages of a method and apparatus for law enforcement to act in the field to determine the balances of prepaid access devices and freeze the account balances for seizure. This prevents criminal organizations from removing funds from accounts associated with prepaid access devices prior to law enforcement seizing the funds. A payment terminal is provided for field use to read the prepaid access devices and poll open loop branded network infrastructure and closed loop private label networks to determine the balances of the associated accounts, and then enter transactions containing freeze instructions and in some cases instructions for seizure. Data from various seizures may be stored and aggregated to determine issuers of the prepaid access devices and analyze trends to aid in further investigation to identify users of such accounts and locate further accounts associated with the prepaid access devices.

Although the preferred embodiment has been described in detail, it should be understood that various changes, substitutions and alterations can be made therein without departing from the spirit and scope of the invention as defined by the appended claims.

What is claimed is:

1. A method for use by law enforcement for obtaining a balance and seizing funds from a prepaid access device, the method comprising the steps of:

providing machine readable instructions stored in machine readable memory for executing the method in one or more a data processing systems;

entering indicia from the prepaid access device into the one or more data processing systems;

forwarding a balance inquiry instruction to an issuing processor, which then polls an issuing financial institution in regard to the balance of funds available in an associated account corresponding to the prepaid access device;

receiving a value for the balance of funds available in the associated account;

forwarding an encumbering instruction for the value of the balance of funds in the associated account, which includes one of a seize instruction and a freeze instruction, and forwarding the encumbering instruction to the issuing processor and the issuing financial institution; and forwarding a claiming instruction to the issuing processor and financial institution to forward the value of the balance of funds from the associated account to a law enforcement account.

2. The method according to claim 1, further comprising instructing the issuing processor and financial institution to forward funds transfer information relating to an identity of accounts and account holders of related accounts from which funds are transferred to or received from the associated account.

3. The method according to claim 1, wherein indicia for the prepaid access device is at least in part machine readable from the prepaid access device and is read by one of a payment terminal provided to law enforcement as one of a wired terminal, a wireless terminal, and a virtual terminal.

4. The method according to claim 1, wherein indicia from the prepaid access device is at least in part entered by being manually keyed by law enforcement into a payment terminal provided by one of a wired terminal, a wireless terminal, and a virtual.

5. The method according to claim 1, wherein the prepaid access device is a prepaid access card and the indicia is encoded on a magnetic stripe.

6. The method according to claim 1, further comprising the step of providing a merchant entity identity for use in cloaking the identity of law enforcement with the balance inquiry and encumbering instructions.

7. The method according to claim 6, wherein several transactions are aggregated for forwarding simultaneously in a single bulk transaction for a plurality of the prepaid access devices.

8. A method for use by law enforcement for obtaining a balance and seizing funds from a prepaid access device, the method comprising the steps of:

providing machine readable instructions stored in machine readable memory for executing the method in one or more a data processing systems;

providing a payment terminal having a scanner for reading indicia from the prepaid access device and entering the indicia from the prepaid access device into the one or more data processing systems;

reading the indicia from the prepaid access device with the payment terminal;

providing a merchant entity identity for use in cloaking the identity of law enforcement;

forwarding a balance inquiry instruction to an issuing processor, which then polls an issuing financial institution in regard to the balance of funds available in an associated account corresponding to the prepaid access device, wherein the balance inquiry instruction includes the indicia from the prepaid access device and the merchant entity identity;

receiving a value for the balance of funds available in the associated account;

forwarding an encumbering instruction for the value of the balance of funds in the associated account, which includes one of a seize instruction and a freeze instruction, and forwarding the encumbering instruction to the issuing processor and the issuing financial institution; and forwarding a claiming instruction for the issuing financial institution to forward the value of the balance of funds from the associated account to a law enforcement account.

9. The method according to claim 8, further comprising instructing the issuing processor and the issuing financial institution to forward funds transfer information relating to an identity of accounts and account holders of related accounts from which funds are transferred to or received from the associated account.

10. The method according to claim 8, wherein indicia for the prepaid access device is at least in part machine readable from the prepaid access device and is read by the payment terminal, and wherein the payment terminal is provided by one of a wireless terminal, a wired terminal, and a virtual terminal.

11. The method according to claim 8, wherein indicia from the prepaid access device is at least in part entered by being manually keyed by law enforcement on the payment terminal.

12. The method according to claim 8, wherein the prepaid access device is a prepaid access card and the indicia is encoded on a magnetic stripe.

13. The method according to claim 8, wherein several transactions are aggregated for forwarding simultaneously in a single bulk transaction for a plurality of the prepaid access devices.

14. A method for use by law enforcement for obtaining a balance and seizing funds from a prepaid access device, the method comprising the steps of:

providing machine readable instructions stored in machine readable memory for executing the method in one or more a data processing systems;

providing one of a payment terminal having a scanner for reading indicia from the prepaid access device and wirelessly entering the indicia from the prepaid access device into the one or more data processing systems;

reading the indicia from the prepaid access device with the payment terminal, and entering the indicia from the prepaid access device into the one or more data processing systems;

providing a merchant entity identity for use in cloaking the identity of law enforcement;

forwarding a balance inquiry instruction to an issuing processor, which then polls an issuing financial institution in regard to the balance of funds available in an associated account corresponding to the prepaid access device, wherein the balance inquiry instruction includes the indicia from the prepaid access device and the merchant entity identity;

receiving a value for the balance of funds available in the associated account;

forwarding an encumbering instruction for the value of the balance of funds in the associated account, which includes one of a seize instruction and a freeze instruction, and forwarding the encumbering instruction to the issuing processor and the issuing financial institution;

forwarding a claiming instruction the issuing processor and the issuing financial institution to forward the value of the balance of funds from the associated account to a law enforcement account; and wherein the prepaid access device contains encoded device indicia which may be machine read.

15. The method according to claim 14, further comprising instructing the issuing processor and the issuing financial institution to forward funds transfer information relating to an identity of accounts and account holders of related accounts from which funds are transferred to or received from the associated account.

16. The method according to claim 14, wherein indicia from the prepaid access device is at least in part entered into the payment terminal, which is provided by one of a wired terminal, a wireless terminal and a virtual terminal by being manually keyed by law enforcement.

17. The method according to claim 14, wherein the prepaid access device is a prepaid access card and the indicia is encoded on a magnetic stripe.

18. The method according to claim 14, wherein several transactions are aggregated for forwarding simultaneously in a single bulk transaction for a plurality of the prepaid access devices.

* * * * *